United States Patent [19]

Swanson

[11] 4,373,669

[45] Feb. 15, 1983

[54] HYDRAULIC DRIVE FOR AN AGRICULTURAL SPRAYER

[75] Inventor: William C. Swanson, Clarendon Hills, Ill.

[73] Assignee: International Harvester Co., Chicago, Ill.

[21] Appl. No.: 210,984

[22] Filed: Nov. 28, 1980

[51] Int. Cl.³ .............................................. B05B 9/04
[52] U.S. Cl. ...................................... 239/124; 60/486
[58] Field of Search ...................... 239/124, 127, 172; 60/325, 486

[56] References Cited

U.S. PATENT DOCUMENTS 2,555,640  6/1951  Garretson ...................... 239/172 X
2,933,897  4/1960  Toutant ............................ 60/486 X Primary Examiner—Andres Kashnikow
Attorney, Agent, or Firm—Boris Parad; F. David AuBuchon

[57] ABSTRACT

An agricultural machine for use in dispensing liquid products through a pump driven sprayer is equipped with a hydraulic pump drive system including a rotary flow divider to intensify pumping pressures driving the sprayer pump while preventing unnecessary fluid flow bypassing operations.

4 Claims, 1 Drawing Figure

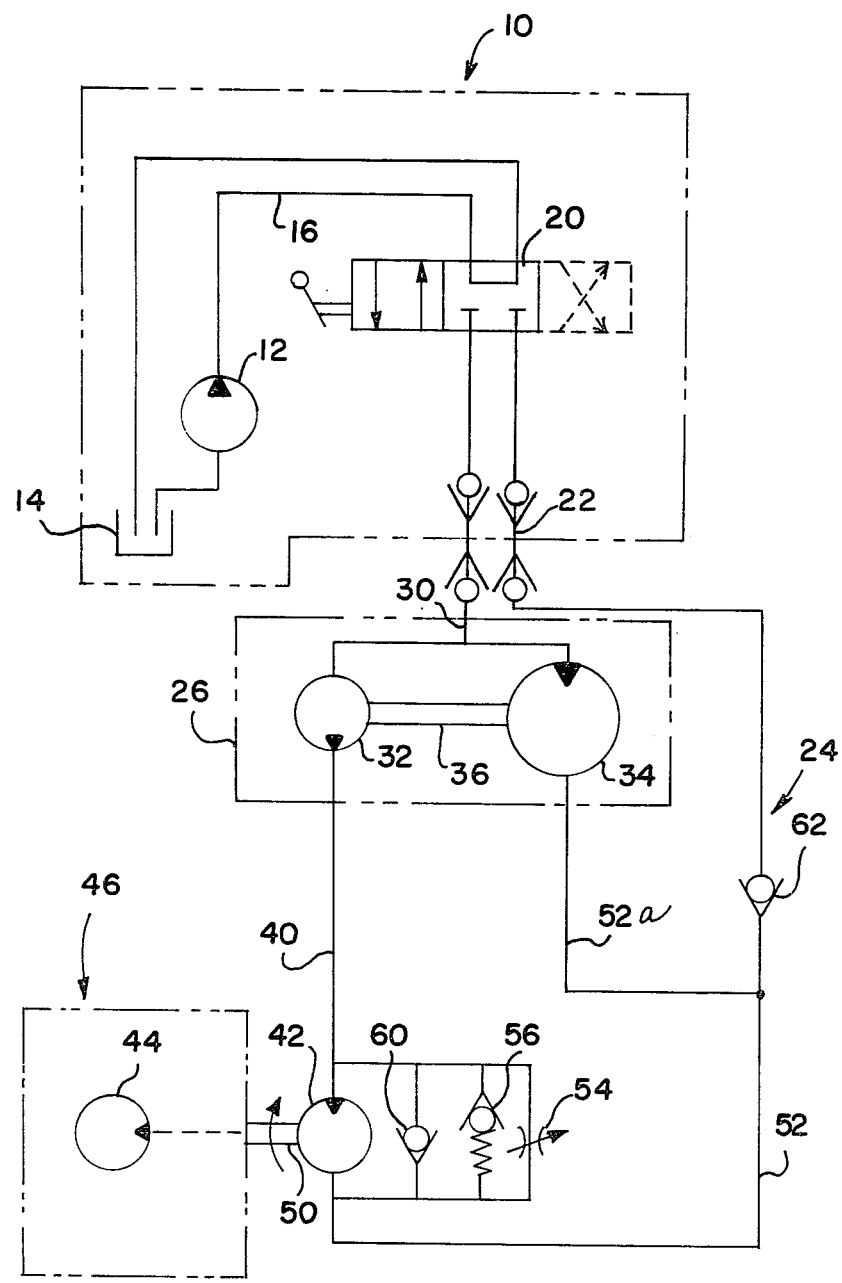

HYDRAULIC DRIVE FOR AN AGRICULTURAL SPRAYER

BACKGROUND OF THE INVENTION

1. Field of the Invention:

An agricultural sprayer is driven through the use of a tractor hydraulic system. More specifically the tractor hydraulic system flow is directed to a rotary flow divider having one rotor acting as a motor while a smaller volume rotor acts as a pump to drive a motor for driving a liquid distribution pump.

2. Description of the Prior Art:

The agricultural practices of modern farmers involve the utilization of many sprayer applied liquid products such as insecticides, weed controls, defoliants and fertilizers. These products are often sprayed onto the ground or onto living plants to effect the desired result. An efficient system to apply the various liquids is through pressurized distribution nozzles and manifolds. The liquid manifold is fed through a pump in the supply line from the storage tank carried on the sprayer implement frame. The pump to generate flow of the liquids is oftentimes a centrifugal impeller pump.

The centrifugal pump is usually driven by a hydraulic motor that receives fluid from hydraulic systems of the host tractor in situations where a tractor pulled sprayer is being used. The hydraulic horsepower needed to drive most of the motor driven centrifugal pumps in use today is four or five horsepower, while the hydraulic horsepower of the auxiliary hydraulic supply of tractors is in the twenty or more horsepower neighborhood. Typically, the host tractors are at least midsize vehicles and range upward to very large vehicles for spraying operations.

Since the tractor hydraulic systems will be delivering about four times the required fluid flow at the pressure required to drive the pump drive motor a large percentage of the fluid has to be bypassed over relief without doing any useful work. Of course this is a substantial energy loss usually generating a considerable undesirable temperature rise in the hydraulic fluid and wasting horsepower.

Although other spraying systems are available the inventor knows of no systems where the host tractor hydraulics are used to drive a motor to drive the liquid pressurizing pump after the flow from the tractor hydraulic system is passed through a rotary flow divider.

Rotary flow dividers per se are known but have not been used in useful applications in the agricultural industry.

SUMMARY OF THE INVENTION

A tractor vehicle has a hydraulic system capable of delivering a generous quantity of hydraulic fluid to an auxiliary circuit. A sprayer or other liquid dispensing system is either attached to or trailered behind the tractor. The sprayer utilizes a centrifugal pump to disperse the treatment spray from a manifold and nozzle portion of the sprayer. The hydraulic system of the host tractor is connected to a rotary flow divider which in turn has a first rotor acting as a pump and a second rotor acting as a motor to drive the first rotor/pump. The rotor/pump output is at high pressure and is used to drive a high pressure low volume motor that in turn drives the centrifugal pump for distribution of the treatment spray.

It is an object of this invention to provide a rotary flow divider in the hydraulic fluid supply circuit used for driving a centrifugal pump in a sprayer in order to allocate flow and pressure to the motor driving the centrifugal pump.

It is also an object of this invention to utilize a rotary flow divider in a sprayer system to prevent the disadvantageous waste of hydraulic horsepower and generation of heat.

Another advantage of this invention is that the net hydraulic power output for the tractor system can be tailored to more nearly approach the actual power requirement of a spray pump motor.

DETAILED DESCRIPTION OF THE DRAWING FIGURE

The sole FIGURE shows the hydraulic circuit in an agricultural tractor and attendant liquid dispensing sprayer combination.

Equipment on the agricultural tractor, generally incorporated into the dashed line container 10 includes a pump 12 drawing hydraulic fluid from reservoir 14 and delivering it through supply conduit 16 to a two position manual control valve 20. An open center valve is shown for simplicity although a closed center system with a pressure compensated pump or a multi-position valve would be equally appropriate.

Quick connect couplings 22 provide the hydraulic connections between the tractor generally 10 and the sprayer pump drive control circuit generally 24.

A rotary flow divider 26 may receive fluid through second supply conduit 30 from the source of fluid 12 when the manual valve 20 is in a second (fluid passing) position. The rotary flow divider includes a pair of rotors 32 and 34, being of different fluid capacities, typically the pump rotor 32 would have a 15 l/min. capacity while the motor rotor 34 would have a 45 l/min. capacity. The motor rotor 34 has a first fluid volume capacity while the pump rotor 32 has a fluid volume capacity fractionally proportional to the first fluid volume capacity of the motor rotor. For example the motor rotor could have four times the volume capacity of the pump rotor. Shaft 36 connects the two rotors.

A portion of the output of the rotary flow divider 26 is distributed via drive flow conduit 40 to a motor 42 which is used to drive the centrifugal impeller pump 44 of a sprayer generally 46 through shaft 50. After passing through motor 42 fluid is directed through return line 52 eventually to the reservoir 14.

The drive motor 42 includes a plurality of controls to protect itself and allow control of its operating pressure. A variable orifice 54 is connected in parallel with the motor 42 and is operator set to adjust the hydraulic fluid passing through the motor. Also in parallel with the motor is a pressure relief valve 56 that is set to open at the desired upper pressure limit of the motor 42. This could alternatively be an adjustable pressure relief valve. A one-way check valve 60 is provided as coast check to prevent the motor 42 from self-destructing when the valve 20 is closed and the impeller pump motors to drive the pump 44 for several instants.

A second one-way check valve 62 is interposed in return line 52 to prevent driving the spray pump backwards by the accidental movement of the manual control valve in the wrong direction when a three position valve as shown by the dotted line segment of the manual control valve 20 is provided.

The motor rotor 34 discharges spent fluid through return line 52a to the return line 52 and eventually to the reservoir 14.

In operation the tractor hydraulic pump 12 will deliver full system flow to the rotary flow divider 26. The rotors of the rotary flow divider are so sized to allow the greater amount of flow to turn the larger rotor 34 as a motor and at a relatively low pressure. This motor rotor 34 then would drive the smaller rotor 32 through shaft 36 as a pump. The smaller pump rotor would be sized to match the flow rate of the spray pump 44. The rotary flow divider 26 acts as a pressure intensifier taking in approximately 60 l/min. of flow at nominally 35.16 k/cm$^2$ and delivering to the motor 15 l/min. at 140.62 k/cm$^2$ and to return line 52a 45 l/min. at 35.16 k/cm$^2$. These figures are examples only but do represent a typical embodiment.

Although the rotary flow divider has been described as having rotors as would be typical of a vane type rotary flow divider the inventor also contemplates the use of gear type rotary flow dividers in the invention. Selection would be a matter of design choice and may be dictated by a specific environment or design operating pressure.

Thus it is clear that there has been provided a hydraulically driven motor for driving a pump of an agricultural sprayer through a pressure intensifying hydraulic circuit including a rotary flow divider that satisfies the objects and aims of this invention. Various modifications and design nuances are contemplated by the inventor and are within the spirit and broad scope of the following claims.

What is claimed is:

1. In an agricultural vehicle with a hydraulic system adapted for use as a liquid dispensing sprayer, a sprayer hydraulic drive comprising:
   an independent hydraulic source circuit including at least a pump and a reservoir;
   valve means interconnecting said circuit with a sprayer pump circuit facilitating activation and deactivation of said sprayer pump circuit for various modes of operation;
   a rotary flow divider operatively connected with said valve means and including a motor rotor linked with a pump rotor via a shaft;
   said pump rotor hydraulically connected with and driving a sprayer motor;
   said sprayer motor driving a centrifugal pump of said liquid dispensing sprayer; and
   pressure relief means for bypassing said sprayer motor and merging with a sprayer pump circuit return line linked with said motor rotor.

2. The invention in accordance with claim 1, and said return line connected with said sprayer motor and said valve means.

3. In an agricultural vehicle with a hydraulic system adapted for use as a liquid dispensing sprayer and including a source of hydraulic fluid, a sprayer means including a centrifugal pump for distribution and dispensing said liquid, a sprayer hydraulic drive comprising:
   a rotary flow divider controllably connectable to said source of hydraulic fluid of said agricultural vehicle;
   said source being able to operate independently of said divider and said sprayer means;
   a motor hydraulically connected to said rotary flow divider for driving said centrifugal pump of said liquid dispensing sprayer;
   a return line hydraulically connected to said rotary flow divider and to said agricultural vehicle hydraulic system;
   a motor rotor having a first fluid volume capacity;
   a pump rotor having a fluid volume capacity fractionally and proportionally lesser than said first fluid volume capacity of said motor rotor;
   a shaft connecting said motor rotor to said pump rotor and driving said pump rotor;
   said pump rotor sized to match flow rate of said centrifugal pump;
   said return line is connected to an outlet of said motor and is provided with a one-way check valve allowing fluid flow from said motor and said rotary flow divider to said agricultural vehicle;
   said motor being equipped with pressure relief means connected to said return line;
   said pressure relief means comprising;
   a coast check valve connected in parallel with said motor;
   a pressure relief valve connected in parallel with said motor and said coast check valve; and
   a variable orifice in parallel with said motor, said pressure relief valve and said coast check valve.

4. The invention in accordance with claim 3, and
   said rotary flow divider being provided with hydraulic fluid at fluid source pressure and dividing said source fluid into a first fluid volume from said motor rotor and a fractionally smaller amount from said pump rotor; and
   said fractionally smaller amount of hydraulic fluid from said pump rotor being at a pressure greater than the pressure of said fluid from said motor rotor.

* * * * *